United States Patent
Ritter et al.

(10) Patent No.: US 6,290,288 B1
(45) Date of Patent: Sep. 18, 2001

(54) SLIDING ROOF FOR VEHICLES

(75) Inventors: Bernhard Ritter, Pforzheim; Martin Tomaschko, Vaihingen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/505,172

(22) Filed: Feb. 16, 2000

(30) Foreign Application Priority Data

Feb. 16, 1999 (DE) .............................. 199 06 334
Mar. 31, 1999 (DE) .............................. 199 14 657

(51) Int. Cl.⁷ ............................................ B60J 7/05
(52) U.S. Cl. ............................................... 296/221
(58) Field of Search .............................. 296/221

(56) References Cited

U.S. PATENT DOCUMENTS 5,098,152 * 3/1992 Sakai .................... 296/223
5,775,769 * 7/1998 Reihl et al. .............. 296/221 X

FOREIGN PATENT DOCUMENTS 195 12 342   10/1996 (DE) .

* cited by examiner

*Primary Examiner*—Dennis H. Pedder
(74) *Attorney, Agent, or Firm*—Crowell & Moring LLP

(57) ABSTRACT

A sliding roof for vehicles is movable in a power-driven manner from a closed position by moving a cover in a first moving direction into an open position and by moving a cover in a second moving direction into a lifted position. In order to provide a sliding roof of the type in the case of which the closed position is reached in a precisely reproducible manner, the closed position is always approached only from a single selected moving direction.

22 Claims, 1 Drawing Sheet

SLIDING ROOF FOR VEHICLES

BACKGROUND SUMMARY OF THE INVENTION

This application claims priority of DE 199 06 334.6, filed Feb. 16, 1999, and DE 199 14 657.8, filed Mar. 31, 1999, the disclosures of which are expressly incorporated by reference herein.

The invention relates to a sliding roof for vehicles of the type which is movable in a power driven manner from a closed position to an open position in a first moving direction and to a lifted position in a second moving direction.

In connection with sliding roofs for vehicle, it is generally known that these sliding roofs can be moved from a closed position, on the one hand, into an open position and, on the other hand, into a lifted position. In this case, the cover of the sliding roof reaches a closed position from two directions, specifically the lifted position coming from above and from the open position coming from below.

Such a sequence of movements leads to the problem that even if the slack is taken into account, when calculating the position of the sliding roof, because of the remaining elasticities in the sliding roof drive, the closed position cannot be reached in a precisely reproducible manner. Particularly if the closed position has been reached from the open position, it is not identical with the closed position reached from the lifted position.

It is an object of the invention to provide a sliding roof of the above-mentioned type in the case of which the closed position can be precisely reproduced.

According to the invention, this object is achieved by providing an arrangement wherein the closed position is always approached from the same moving direction. It is suggested according to the invention to approach the closed position always only from a single selected moving direction. As the result of this measure, the influence of the transmission slack and the elasticities in the drive of the sliding roof is suppressed, and the cover reaches the same position during each final closing operation. This advantageously improves the visual effect of the vehicle and the cover of the sliding roof can be aligned such in the closed position that the wind noise generated when the cover is closed by the gap surrounding the cover is minimized. As the result of the invention, in one embodiment, the position tolerance of the cover in its closed position could be improved from 1.5 mm to 0.1 mm. In addition, the invention can be implemented in a simple manner by the corresponding programming of a control unit and particularly without high-expenditure additional mechanical measures.

As a further development of the invention, it is also suggested that, during a closing operation from the non-selected moving direction, the closed position is approached by driving and subsequently from the selected moving direction.

It is also suggested to ensure that the cover of the sliding roof, when moving through the closed position, is not moved out of an opening of the sliding roof. This prevents that, when the cover dips through the closed position, a gap is formed at the edge of the cover which may result in disturbing wind noise and may also cause pressure changes in the vehicle interior.

Finally, it is suggested that the closing operation be automatically carried out from the non-selected moving direction as soon as the closed position has been reached the first time. According to this construction, the dipping-through of the cover will also be carried out when the user releases an actuating switch for the sliding roof, as soon as the cover reaches its closed position for the first time. Particularly in conjunction with the above-mentioned construction, such an operation can be carried out without any risk since, during this automatically occurring movement, no gap is formed into which fingers or objects can be squeezed.

Other objects, advantages and novel features of the present invention will become apparent from the following detailed description of the invention when considered in conjunction with the accompanying drawings.

DETAILED DESCRIPTION OF THE DRAWINGS

Figure 1:
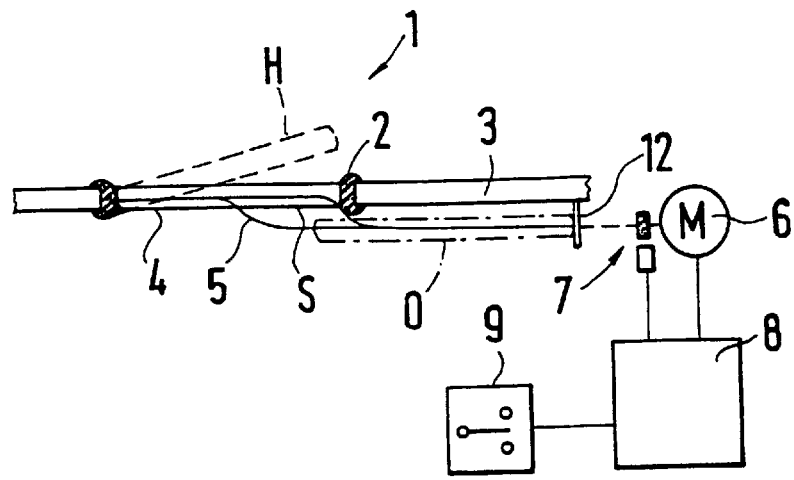
FIG. 1 is a schematic representation of a power-driven sliding roof for vehicles, constructed according to a preferred embodiment of the present invention.

The sliding roof 1 illustrated in FIG. 1 is inserted in a vehicle body cutout 2 of a vehicle 3 shown schematically only in part. The sliding roof 1 consists of a cover 4 fitted into the vehicle body opening 2, a guide 5, an electric driving motor 6, a position generator 7 connected with the motor 6, a control unit 8 as well as an actuating switch 9. From the illustrated closed position S, the sliding roof 1 can be moved into a lifted position H (indicated by a broken line) as well as an open position O (illustrated by a dash-dotted line).

Figure 2:
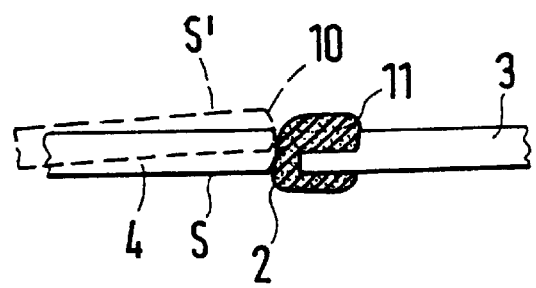
FIG. 2 is a detailed view of a part of an arrangement of FIG. 1.

FIG. 2 is a detailed view of a rear edge 10 of the cover 4 which, in the closed position S, rests on a seal 11 bounding the vehicle body cutout 2. The position of the rear edge 10 is significant in that, in the second closed position S' indicated by the broken line, the rear edge 10 projects beyond the seal 11 and, as a result, during a fast drive, generates very disturbing high-frequency noises. The second closed position S' is reached when the cover 4 is closed from the lifted position H, while the closed position S is reached when the cover 4 is closed from the open position 0. The causes are the slacks and elasticities in the guide 5, in the driving elements (not shown) accommodated within the guide and connected with the motor 6, and in the motor 6 or in the transmission connected with the motor 6.

The position of the cover 4 is detected by the position generator 7, which is non-rotatably connected with the motor 6 and emits pulses as a function of the revolution of the motor 6; in the present case, these are two pulses per revolution. In the control unit 8, a counter is provided, which is not shown and which detects the pulses emitted by the position generator 7. In the control unit 8, the closed position S is programmed when the sliding roof 1 is mounted for the first time, in that, starting from the open position O, the number of pulses is detected until the closed position S is reached. The counter is always set to 0 when the cover 4 is moved into the open position O. In this position, the cover 4 strikes against a constructionally provided stop 12. As the result of the suddenly increased current requirement of the motor 6, the control unit 8 recognizes that the end position has been reached and resets the counter to the 0 value.

During the first mounting and, as required, also in the continuous operation, this ensures that the count of the counter always corresponds to the actual position of the cover 4.

Figure 3:
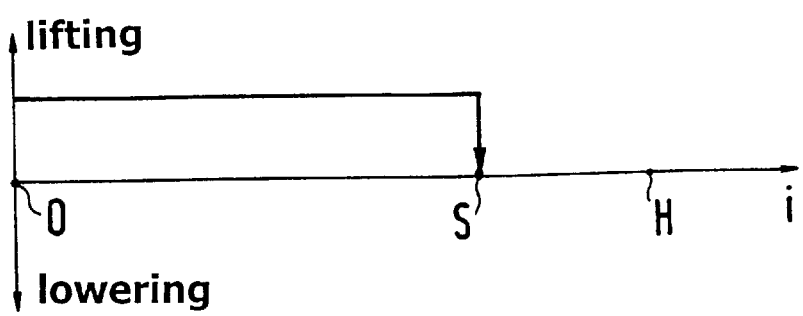
FIG. 3 is a view showing a sequence of movements when closing the sliding roof from its open position.

FIG. 3 illustrates the sequence of movements during the closing of the sliding roof 1 by means of the count "i" of the counter. The cover is in the open position O and, upon an actuating of the switch 9, is moved, as the result of an energizing of the motor 6, into the "lifting" direction until the closed position S has been reached. The cover 4 is now in the closed position S illustrated in FIG. 2 which it has reached coming from below in the representation of FIG. 2.

Figure 4:
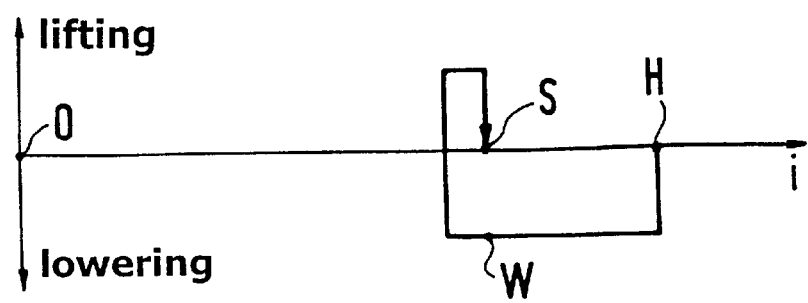
FIG. 4 is a view showing a sequence of movements when closing the sliding roof from its lifted position.

FIG. 4 shows the sequence of movements when the sliding roof 1 is closed from a lifted position H. Upon a corresponding operation of the actuating switch 9, the motor 6 is operated in the "lowering" direction. When, in this case, the count "i" at point W reaches the count assigned to the closed position S, the motor 6 will still be operated for a short time, until the cover 4 has been safely lowered below the closed position S. Care should be taken in this case that, during this further operation, the rear edge 10 does not leave the seal 11; that is, that no gap is formed as the result of the further operation. Subsequently, the motor 6 is briefly controlled into the "lifting" direction, until the closed position S has been reached again. In the representation according to FIG. 2, this means that, during a closing from the lifted position H, the cover 4 dips briefly through below the closed position S in order to then again reach the closed position S coming from below. In this case, the closing operation takes place automatically from position W; that is, also without any further operation of the actuating switch 9.

Since, also during a closing from the lifted position H, the cover 4 is moved from the same direction into its closed position S as during a closing from the open position O, it is ensured that an identical closed position S is reached during both closing operations. In particular, it is avoided that the cover 4 takes up the closed position S'.

As the result of this approach, the influence of the transmission slack is suppressed, which exists in the guide 5 as well as the transmission elements provided within the guide 5. Furthermore, it is also ensured that the seal 11 is always deformed in the same manner when the cover 4 is in the closed position S. Since the exterior shape of the seal 112 influences the wind noise in the area of the rear edge 10 of the cover 4, the described approach can also ensure that the seal 11 always assumes a shape which is optimal for a minimized generating of noise.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle roof assembly comprising:
    a vehicle roof with a cut out opening,
    a sliding roof member supported at the roof to be movable to a cut out opening closed position in a first direction from a roof open position and in a second direction from a roof lifted position,
    and a power driven control assembly which is operable to move the roof member to said closed position from a respective one of the roof open and roof lifted positions,
    wherein said control assembly includes an electric driving motor for moving the roof member, a roof member position generator non-rotatably connected with the driving motor and operable to generate pulse signals as a function of revolutions of the motor, and an electronic control unit responsive to the pulse signals from the position generator to control the driving motor to control the path of movement of the roof member,
    said electronic control unit being programmable to assure movement of the roof member to said closed position in a selected one of the first and second directions, irrespective of whether the roof member starts from the lifted position or the open position.

2. A vehicle roof assembly according to claim 1, wherein said electronic control unit includes:
    means for recording a first initial number of the pulse signals generated during initial operation of the motor to move the roof member from the open position to the closed position,
    means for setting the number of impulses to zero when the roof member is in the open position, and
    means for controlling subsequent operation of the motor when moving from the open position to the closed position by stopping the motor after said first initial number of pulses are detected.

3. A vehicle roof assembly according to claim 2, wherein said control assembly is operable to always move the roof member to said closed position in a selected one of said first and second directions irrespective of an initial open or lifted position of the roof member.

4. A vehicle roof assembly according to claim 2, wherein said control assembly is operable to move the roof member toward and beyond the closed position when initial movement from an initial open or lifted position is in a non-selected one of said first and second directions.

5. A vehicle roof assembly according to claim 1, comprising a structural limit stop defining the open position.

6. A vehicle roof assembly according to claim 2, comprising a structural limit stop defining the open position.

7. A vehicle roof assembly according to claim 3, comprising a structural limit stop defining the open position.

8. A vehicle roof assembly according to claim 4, comprising a structural limit stop defining the open position.

9. Sliding roof as claimed in claim 2, wherein the closed position is always approached from just one selected direction of movement, and
    wherein, if a closing process from a direction of movement that is not selected takes place, the closed position is passed through and subsequently approached from the selected direction of movement.

10. Sliding roof as claimed in claim 9, wherein upon passing through the closed position the roof member is moved further only so far that it does not leave a seal for sealing the closed position.

11. Sliding roof as claimed in claim 9, wherein after reaching the closed position for a first time from the direction of movement that is not selected, the closing procedure is implemented automatically until the closed position is reached for a second time.

12. A method of operating a vehicle roof assembly which includes:
    a vehicle roof with a cut out opening,
    a sliding roof member supported at the roof to be movable to a cut out opening closed position in a first direction from a roof open position and in a second direction from a roof lifted position,
    and a power driven control assembly which is operable to move the roof member to said closed position from a respective one of the roof open and roof lifted positions, wherein said control assembly includes an electric driving motor for moving the roof member, a roof member position generator non-rotatably connected with the driving motor and operable to generate pulse signals as a function of revolutions of the motor, and an electronic control unit responsive to the pulse signals from the position generator to control the driving motor to control the path of movement of the roof member, said electronic control unit being programmable to assure movement of the roof member to said closed position in a selected one of the first and second directions, irrespective of whether the roof member starts from the lifted position or the open position, said method comprising using said control unit to control the power driven control assembly to always move the roof member to the closed position in a selected one of said first and second directions irrespective of an initial position of the roof member away from the closed position.

13. A method of operating a vehicle roof assembly according to claim 12, comprising utilizing said electronic control unit to:

record a first initial number of pulse signals generated during initial operation of the motor to move the roof member from the open position to the closed position, setting the number of impulses to zero when the roof member is in the open position, and controlling the operation of the motor when moving from the open position to the closed position by stopping the motor after said first initial number of pulses are detected.

14. A method of operating a vehicle roof assembly according to claim 13, wherein said control assembly is operable to always move the roof member to said closed position in a selected one of said first and second directions irrespective of an initial open or lifted position of the roof member.

15. A method of operating a vehicle roof assembly according to claim 13, wherein said control assembly is operable to move the roof member toward and beyond the closed position when initial movement from an initial open or lifted position is in a nonselected one of said first and second directions.

16. A method of operating a vehicle roof assembly according to claim 12, further comprising defining the open position by a structural limit stop at the vehicle roof cut out opening.

17. A method of operating a vehicle roof assembly according to claim 13, further comprising defining the open position by a structural limit stop at the vehicle roof cut out opening.

18. A method of operating a vehicle roof assembly according to claim 14, further comprising defining the open position by a structural limit stop at the vehicle roof cut out opening.

19. A method of operating a vehicle roof assembly according to claim 15, further comprising defining the open position by a structural limit stop at the vehicle roof cut out opening.

20. A method of operating a vehicle roof assembly according to claim 13, wherein the closed position is always approached from just one selected direction of movement, and wherein, if a closing process from a direction of movement that is not selected takes place, the closed position is passed through and subsequently approached from the selected direction of movement.

21. A method of operating a vehicle roof assembly according to claim 20, wherein upon passing through the closed position the roof member is moved further only so far that it does not leave a seal for sealing the closed position.

22. A method of operating a vehicle roof assembly according to claim 20, wherein after reaching the closed position for a first time from the direction of movement that is not selected, the closing procedure is implemented automatically until the closed position is reached for a second time.

* * * * *